(12) United States Patent
Gilmore

(10) Patent No.: US 6,453,935 B1
(45) Date of Patent: Sep. 24, 2002

(54) FLUID INJECTOR WITH VENT/PROPORTIONER PORTS

(75) Inventor: Dan Gilmore, Roseville, CA (US)

(73) Assignee: E-Z Flo Injection Systems, Inc., Wexford, PA (US)

( * ) Notice: Subject to any disclaimer, the term of this patent is extended or adjusted under 35 U.S.C. 154(b) by 13 days.

(21) Appl. No.: 09/895,629

(22) Filed: Jul. 2, 2001

(51) Int. Cl.$^7$ ................................................ F04F 5/10
(52) U.S. Cl. ...................................... 137/268; 422/264
(58) Field of Search ........................... 137/268; 422/264

(56) References Cited

U.S. PATENT DOCUMENTS

| | | | |
|---|---|---|---|
| 3,052,525 A | | 9/1962 | Vogelmann ................ 23/272.7 |
| 3,455,054 A | * | 7/1969 | Tibbals, Jr. .................. 137/268 |
| 3,809,291 A | | 5/1974 | Purdy .......................... 222/145 |
| 4,193,516 A | | 3/1980 | Purdy ........................... 222/57 |
| 4,339,332 A | | 7/1982 | Jasperson ................ 210/198.1 |
| 4,846,214 A | | 7/1989 | Strong ........................ 137/268 |
| 5,010,912 A | | 4/1991 | Riding ........................ 137/268 |
| 5,253,677 A | | 10/1993 | Sand ........................... 137/888 |
| 5,484,106 A | | 1/1996 | Gilmond ...................... 239/317 |
| 5,544,810 A | | 8/1996 | Horvath ........................ 239/10 |
| 6,039,065 A | | 3/2000 | Gagliardo ....................... 137/3 |

* cited by examiner

Primary Examiner—Kevin Lee
(74) Attorney, Agent, or Firm—Mark R. Galis; Gary R. Jarosik

(57) ABSTRACT

A fluid injector made of pressure rated components that attach to a fluid flow line so that flow is transferred from the flow line, into the injection unit and back to the fluid flow line. The inlet flow is used to pressurize the storage tank and provide a solution to mix with injection solutions in the tank to provide an accurate preset or adjustable injection rate into the fluid flow line. Vent/proportioner ports provide back flow protection, prevent fluid from siphoning from the storage tank, provide an internal air release port and set injection ratios. A mixing control valve adjusts the injection ratios by mixing outgoing injection solutions with incoming fluid from the fluid flow line. Flexible bladders isolate one or more injection solutions within one storage container which are injected simultaneously at independent injection rates.

5 Claims, 4 Drawing Sheets

FLUID INJECTOR WITH VENT/PROPORTIONER PORTS

CROSS-REFERENCE TO RELATED APPLICATIONS

Not applicable.

BACKGROUND—FIELD OF INVENTION

This invention relates to storage tanks and fluid injection systems, specifically to injection metering devices.

BACKGROUND—DESCRIPTION OF PRIOR ART

A variety of means have been used to inject fluids into fluid streams. These include metering pumps, water powered pumps, siphon devices, flow through devices and gravity feed drainage equipment.

There are a number of problems encountered with each type of equipment available in delivering an accurately proportioned injection amount. Metering pumps are either set to inject a predetermined amount into a fluid stream without a means of adjusting to changes in flow volume in the fluid stream, or they are controlled electronically by flow sensors located in the fluid stream. The components of this type of system are mechanical and electronic so they are subject to wear and mechanical failure. Water powered pumps adjust automatically to changes in flow in the fluid stream but are a mechanical device with a number of seal points. The seals require frequent maintenance for the unit to operate properly. This design is limited in the amount of fluid flow it can operate with and as flows increase, the cost of the device increases. Siphon devices rely on a high restriction in the fluid stream to create venturi suction strong enough to pull the injection solution from the storage container. They require high pressure to operate and the high restriction in the fluid stream greatly reduces the fluid stream volume. Fluctuations in pressure can cause the device to not inject continuously creating uneven distribution. They are also unable to dependably inject solutions such as water-soluble fertilizers without plugging. Venturi systems generally have relatively small flow orifices and the fertilizer solution has a tendency to settle, creating sedimentation that plugs these orifices. Flow through devices typically channel the flow of the fluid stream through a container that holds a soluble product that slowly breaks down, releasing the product into the stream. This method doesn't control the amount being distributed and can give unreliable distribution. It is common for the soluble products to melt as they sit in the water while the system is not operating and release a large amount when the system is restarted.

Several types of fluid injectors have been developed to proportion liquid or soluble fertilizers or chemicals into fluid piping systems. My U.S. Pat. No. 5,484,106, Automatic Pressurized Adjustable Solution Dispenser accomplishes this task but relies on a check valve to prevent back flow of contaminants into the fluid stream. With this design, the outlet flow port connection needs to extend to the bottom of the storage tank to establish a consistent injection rate of fertilizers, which have a higher specific gravity than the incoming water. When the outlet port connection is extended to the bottom of the storage tank, the system develops an air pocket in the top of the storage tank that can only be eliminated by manually filling the tank with fluid or some other means of manually venting the system. If the air is not removed from the system, a potentially hazardous condition exists in that air compresses under pressure, which creates a higher stress on the storage tank than fluids under pressure and can cause the storage tank to rupture at much lower operating pressures. The presence of air also reduces the amount of fluid in the storage tank. This limits the fluid available to mix with soluble products to make them an injectable solution, causing the system to not inject accurately or possibly not inject at all due to plugged flow ports. Since there is no way for air to escape the storage tank, soluble products must be premixed and the tank filled with water before using the system. Many soluble products begin settling to the bottom of the tank immediately after being mixed. Continual agitation is required to keep them in an injectable state. This requires extending the inlet port near the bottom of the storage tank to direct flow through the soluble product. Also, this design does not provide a means of injecting more than one solution from the same tank at independent ratios.

The U.S. Pat. No. 4,846,214, Fluid Additive Injector by Thomas F. Strong has an automatic mechanical air relief valve that vents air from the storage tank to the atmosphere. While it does evacuate the air from the tank automatically, it is mechanical in nature so it is subject to wear and eventual failure. It does not provide back flow protection, establish proportioning rates or allow air to be vented through the piping system. It also does not provide a means of injecting more than one solution from the storage tank at independent ratios.

The U.S. Pat. No. 3,809,291, Liquid Proportioning System by Chester A. Purdy is a gravity feed system that uses an internal mixing chamber to combine two liquids to be dispensed into a fluid stream. It requires an electrical controller, a pressure switch and a float valve to control fluid flow into the tank.

The U.S. Pat. No. 5,544,810, Precision-Ratioed Fluid-Mixing Device And System by Horvath, Abrams and Helf utilizes a high pressure flow line to create a venturi to draw multiple fluids from multiple unpressurized containers and accurately mix them into one solution. The system has an air vent to the atmosphere to prevent siphoning of fluid from the storage containers when the system is not operating. This design requires a high-pressure flow line to create enough vacuum to draw fluids from the containers. This creates a high restriction in the flow line, significantly reducing flow volume and pressure. It also requires multiple containers to store the various solutions, which requires piping connections between all the containers used. This design cannot operate at low pressures or automatically mix dry products and keep them an injectable solution.

The U.S. Pat. No. 6,039,065, Fluid Proportioning Valve And Method by John P. Gagliardo is a mixing valve that combines liquids at controllable proportions. It does not provide for the injection of liquids into a flow line, only the mixing of incoming flows.

My invention solves a number of problems that have been present in prior art. It eliminates the need for a mechanical check valve and air relief valves, which are subject to wear, leakage and failure. It operates at very low pressures without the need for restriction in the flow line. It operates totally on pressure from the flow line and injects very accurately. It can handle dry products as well as very heavy products without plugging or manual mixing. It can inject multiple solutions at independent injection rates from one storage tank.

OBJECTS AND ADVANTAGES

Accordingly, the objects and advantages of my invention are:

(a) Provides the ability to accurately inject one or more liquid solutions into a fluid stream at independent injection rates.

(b) Soluble products can be put in the storage tank dry and the system will exhaust all air from the storage tank while mixing the products automatically, eliminating manual mixing and plugging.

(c) Provides back flow and siphoning protection without the need for mechanical check valves and air relief valves, which makes the system more dependable, less expensive to manufacture, have a longer service life and require less maintenance.

(d) Flow control allows a wide range of injection rates, which gives the user the ability to apply the products in minutes or over weeks or months.

(e) Highly concentrated product can be used, which reduces storage requirements.

(f) There are no moving parts to wear out or break. All operations are controlled by system flow.

(g) Little exposure to hazardous chemicals. The chemicals can be applied in very low amounts automatically, which eliminates any exposure during the application process as well as better absorption rates, reducing negative environmental impact.

(h) Mixing incoming fluid with the outgoing solution makes the injection rate slower so flow ports can be made larger which allows more fluid through the system, which prevents plugging, improves mixing and improves injection accuracy.

(i) Inlet connections can be extended to the bottom of the tank to provide agitation of soluble or heavy products, which keeps them in a more injectable state and eliminates the need for manual mixing when the system is initially filled. It also allows a higher concentration of product to be put in the storage tank.

(j) Outlet connections can be extended to the bottom of the tank to provide consistent, accurate metering of the injected solution.

(k) Provides a consistent injection stream so the injected solution is more evenly mixed in the flow line.

(l) Operates at very low flow rates and pressures with no restriction on flow line pressure or volume, giving it a broad range of use in many applications.

(m) Responds to the smallest changes in pressure or velocity in the flow line, making it very accurate in all applications.

(n) Convenient emptying and filling of single or multiple solutions.

Still further objects and advantages will become apparent in the ensuing drawings and description.

SUMMARY

In accordance with the present invention a fluid injector with vent/proportioner ports comprises a fluid injector that utilizes fluid from a flow line to accurately inject fluids into the flow line. The system mixes incoming fluid with outgoing injection solution to provide a wide range of flow adjustment. It uses flow orifices to provide air release from the storage tank as well as provide back flow protection. It utilizes multiple bladders to inject multiple solutions from one storage tank.

DRAWING FIGURES

In the drawings, closely related figures have the same number but different alphabetical suffixes.

Figure 1:
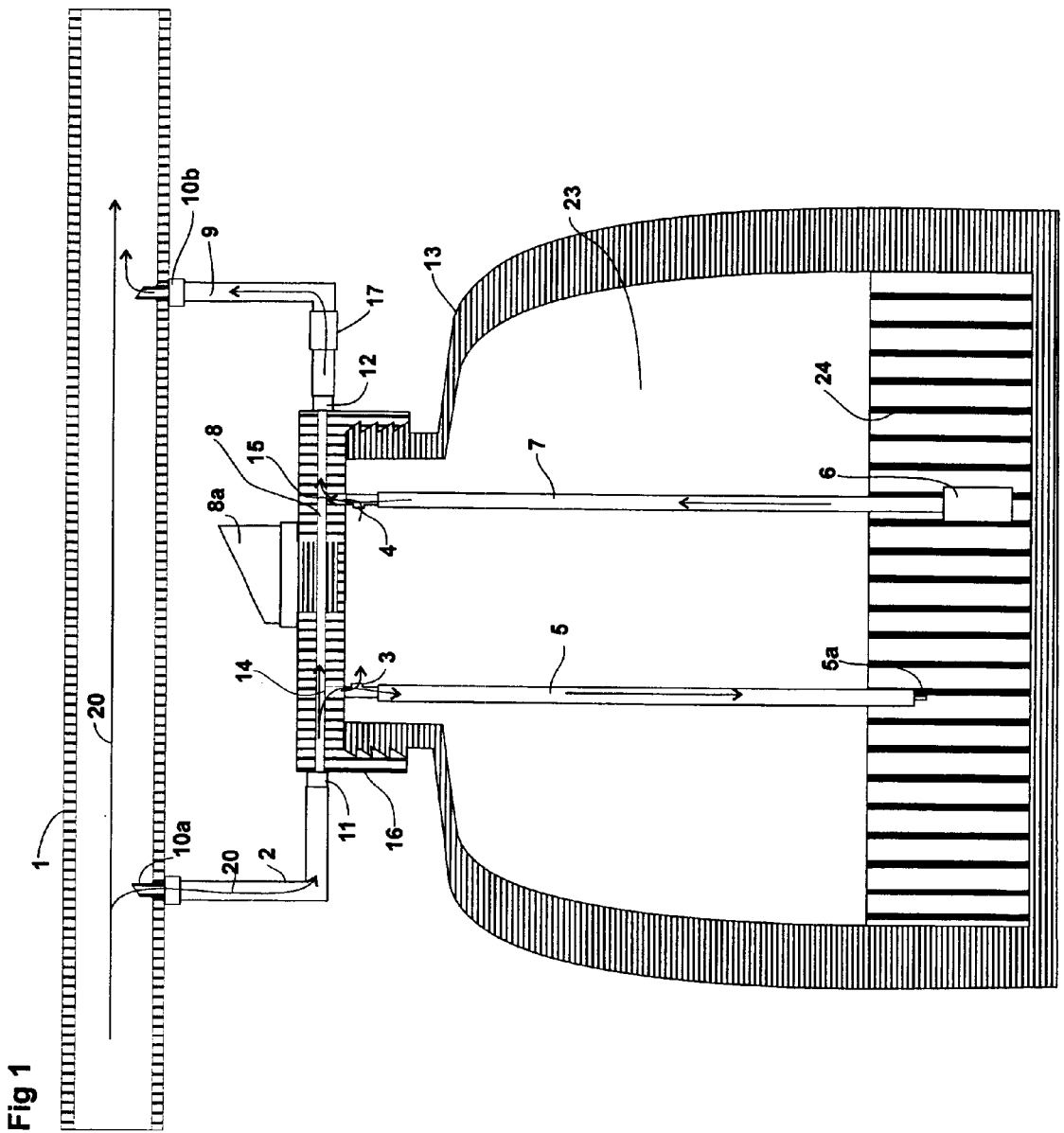
FIG. 1 shows an overview of the system operating and how it is connected to a fluid flow line.

| Reference Numerals In Drawings | | | |
|---|---|---|---|
| 1 | fluid flow line | 2 | inlet connection tube |
| 3 | inlet vent/proportioner port | 4 | outlet vent/proportioner port |
| 5 | agitation tube | 5a | agitation nozzle |
| 6 | pickup filter | 7 | pickup tube |
| 8 | crossover connection | 8a | mixing valve |
| 9 | outlet connection tube | 10a | tap fitting |
| 10b | tap fitting | 11 | tank inlet connection |
| 12 | tank outlet connection | 13 | storage tank |
| 14 | tank inlet port | 15 | tank outlet port |
| 16 | storage tank cap | 16a | bladder |
| 16b | bladder | 17 | site tube |
| 17a | fill port | 17b | fill port |
| 17c | fill port | 18 | drain valve |
| 19a | fill port valve | 19b | fill port valve |
| 19c | fill port valve | 20 | flow direction |
| 21 | injection solution | 22 | injection solution |
| 23 | fluid from flow line | 24 | injection solution |
| 25 | air | | |

DESCRIPTION
FIGS. 1,2,3—PREFERRED EMBODIMENT

A preferred embodiment of the fluid injector with vent/proportioner ports is shown in FIG. 1. This side view shows a basic view of the invention and how it connects to a fluid flow line. The system can be manufactured from various types of plastic, metal or both. Plastic connections can be glued or threaded. Metal connections can be threaded, welded or braised. The tank inlet connection is connected to fluid flow line 1 by attaching inlet connection tube 2 to tapping fitting 10a. The tank outlet connection 12 is connected to fluid flow line 1 by attaching outlet connection tube 9 to tapping fitting 10b. The tank inlet connection 11 is connected to tank outlet connection 12 by crossover connection 8. Mixing valve 8a is located in the crossover connection 8, between tank inlet connection 11 and tank outlet connection 12. The tank inlet connection 11 is attached to tank inlet port 14, which is attached to inlet vent/proportioner port 3 and agitation tube 5. Agitation nozzle 5a is attached to the end of agitation tube 5, which extends into the bottom portion of storage tank 13. The tank outlet connection 12 is attached to the tank outlet port 4, which is attached to outlet vent/proportioner port 4 and pickup tube 7. Pickup filter 6 is attached to the end of pickup tube 7, which extends to the bottom of storage tank 13. Site tube 17 is located in the outlet connection tube 9 between tank outlet connection 12 and tap fitting 10b.

Operations—FIG. 1, 2, 3

The method of using the fluid injector with vent/proportioner ports is to connect it to a fluid flow line as shown in FIG. 1.

Once the unit has been installed, shut off all flow in the fluid flow line 1. Remove the inlet connection tube 2 and outlet connection tube 9 from the storage tank cap 16.

Remove the storage tank cap 16 from the tank and add the material to be injected, to the storage tank 13. Put the storage tank cap 16 on the tank and attach the inlet connection tube 2 and outlet connection tube 9 to the storage tank cap 16. Adjust the mixing valve 8a to desired injection rate and turn on flow in fluid flow line 1.

When the system is operating, a positive pressure is created by tap fitting 10a creating fluid flow from fluid flow line 1, which is directed through inlet connection tube 2 to tank inlet connection 11. The fluid is then directed through crossover connection 8 to the tank outlet connection 12 and through tank inlet port 14 to storage tank 13. The amount of flow to each area is controlled by mixing valve 8a. As mixing valve 8a is opened, more fluid flows through crossover connection 8 and less fluid through tank inlet port 14. This reduces the amount of fluid leaving the storage tank 13 which reduces the concentration of the fluid injected into the fluid flow line 1. The fluid entering the storage tank 13 through tank inlet port 14 flows through inlet proportioner/vent port 3 to the top of storage tank 13. The size of the inlet proportioner/vent port 3 determines the amount of flow diverted to the top and bottom of the storage tank 13. This controls the amount of agitation action directed at injection solution 24. The balance of the fluid entering the storage tank 13 is directed through the agitation tube 5, through agitation nozzle 5a, into the bottom of the tank and into the injection solution in the bottom of the tank. By directing the inlet flow to the bottom of the tank, dry soluble products are mixed automatically with inlet fluid from fluid flow line 1 as the storage tank 13 is filling. The air in storage tank 13 is exhausted through outlet vent/proportioner port 4 into the fluid flow line 1. Since air moves more easily than liquid, no fluid leaves the storage tank 13 until all the air has been exhausted. This provides thorough mixing of injection solution 24 which creates accurate injection and prevents plugging.

Flow entering storage tank 13 pressurizes storage tank 13 to the same pressure as the fluid flow line 1. A negative pressure is created by tap fitting 10b creating flow from storage tank 13. This flow is directed through pickup filter 6 through pickup tube 7 as well as through vent/proportioner outlet port 4 to tank outlet port 15. The size of the vent/proportioner outlet port 4 determines the mix ratio of fluid inside the storage tank 13 and injection solution 20. It then flows through crossover connection 8, where it mixes with inlet flow and then flows through tank outlet connection 12 to tap fitting 10b through outlet connection tube 9.

Tap fittings 10a and 10b do not create any restriction in flow line 1. Because the storage tank 13 is pressurized to the same pressure as flow line 1, any changes in flow line 1 pressure or velocity is communicated to storage tank 13 immediately, making the system very responsive to changes in flow and very accurate. This also enables the system to begin operating with as little as two gallons per hour flow in fluid flow line 1 and at as little as 5 PSI operating pressure. The system has no capacity or volume restrictions. If flow restriction is put between tap fitting 10a and tap fitting 10b, the operating range is increased. It can be adapted to any size application. Because the flow through the system is consistent, not pulsating, the injection solution 24 entering the fluid flow line 1 is consistent throughout the fluid flow line 1 solution.

When the system is operating, injection flow can be seen through site tube 17. When material is no longer visible in site tube 17, the system is empty and ready for refill.

Figure 2:
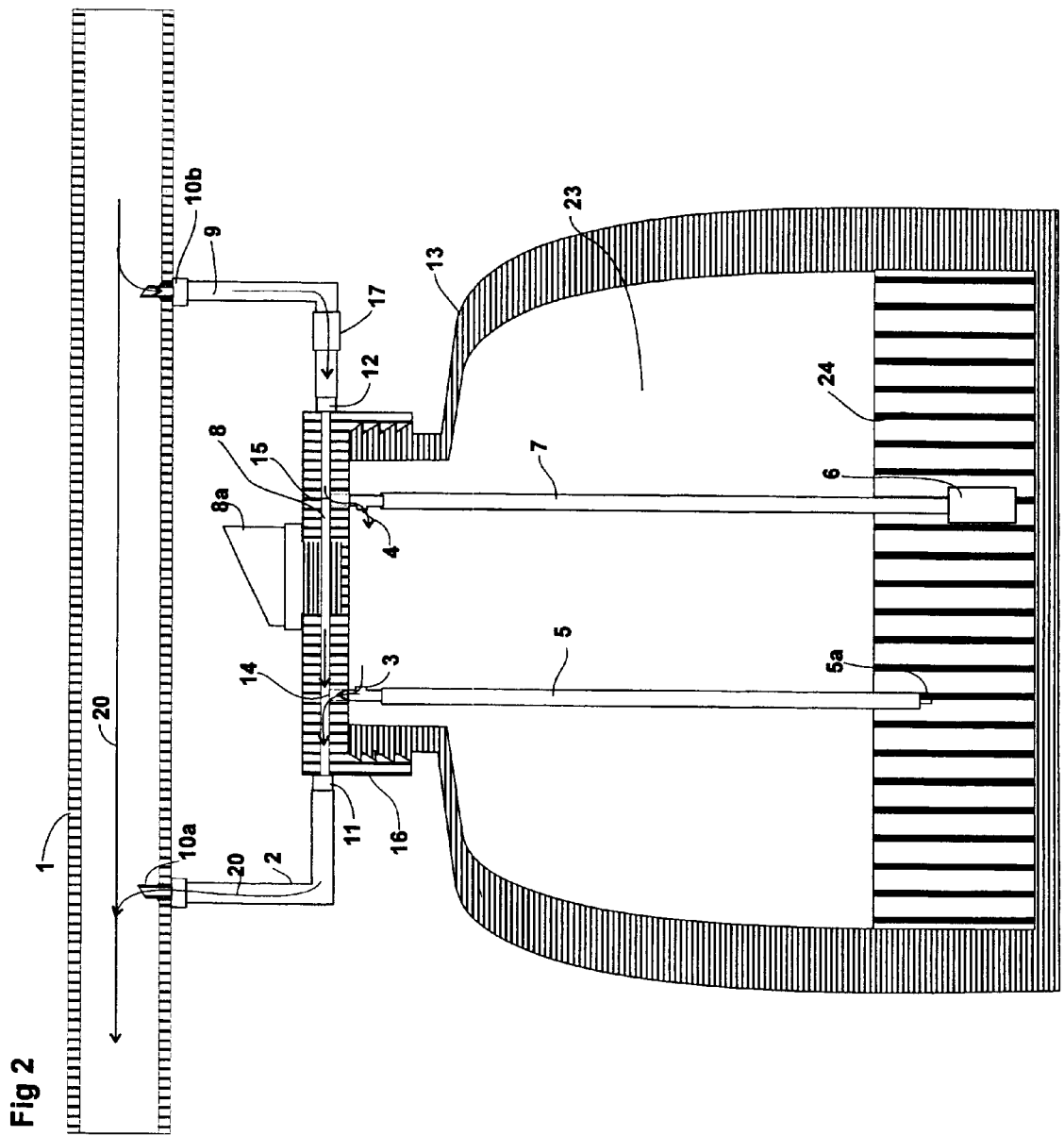
FIG. 2 shows an overview of the system operating during back flow conditions.

FIG. 2 shows the flow pattern when a back flow condition exists. To create a back flow condition, pressure is lost in fluid flow line 1 so any fluid in the fluid flow line 1 reverses direction. This reverses the flow through the system by creating a positive pressure at tap fitting 10b. This directs flow into the storage tank through the fertilizer outlet tube 9, the tank outlet connection 12 and then through the tank outlet port 15 and crossover connection 8. The adjustment valve 8a setting determines the amount of fluid that reenters the storage tank.

The more open the mixing valve 8a is set, the more fluid that will bypass the storage tank 13 and return to the fluid flow line 1 through the inlet connection tube 2. The fluid that does not go through the crossover connection 8 will flow into the storage tank 13 through the tank outlet port 15. This directs the fluid to the top of the tank and back out of the tank through the vent/proportioner inlet port 3. Since there is a loss of pressure in a back flow condition, there is much less flow in the fluid flow line 1. This enables the vent/proportioner ports 3 and 4 to handle all incoming and outgoing flow, preventing any toxic material from the bottom of the tank from entering the fluid flow line 1.

Figure 3:
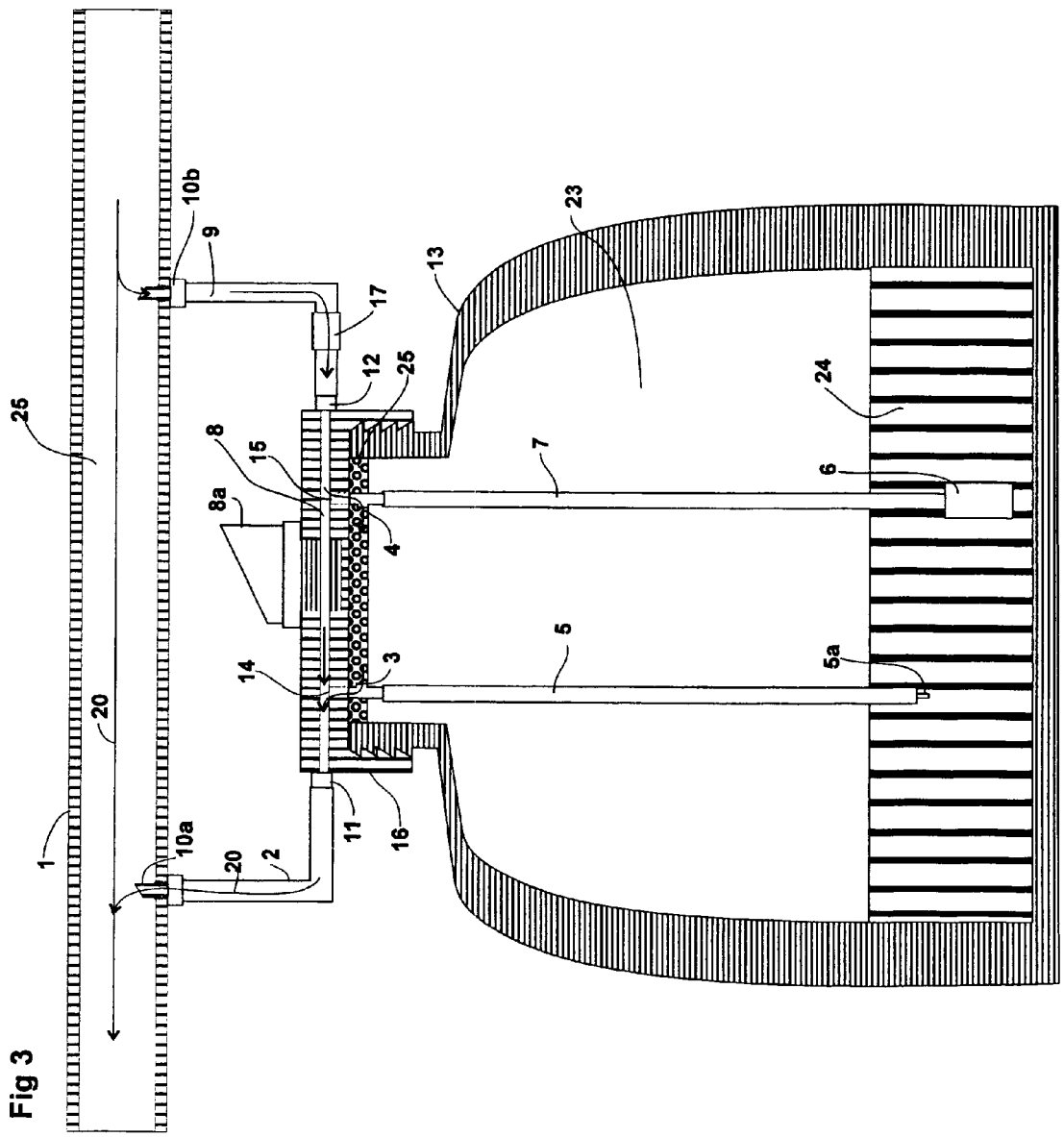
FIG. 3 shows an overview of the system operating during back flow with vacuum conditions.

FIG. 3 shows how the system operates when all the fluid has been eliminated from the fluid flow line 1. The fluid is replaced by air which creates a vacuum condition. The air follows the same flow path as the fluid does during back flow conditions. Once air has entered the storage tank 13 through tank outlet port 4, it flows through the inlet vent/proportioner port 3 to the fluid flow line 1. Because air flows more easily than fluid, only air flows through the system. This puts the system in an air lock condition which prohibits any liquid from leaving the storage tank 13.

To refill the unit, shut off all flow in the fluid flow line 1. Relieve pressure from the storage tank 13 by opening a valve downstream in the fluid flow line 1 or by slowly removing the outlet connection tube 9 from the storage tank cap 16. Once pressure has been relieved, remove inlet connection tube 2 and outlet connection tube 9 from the storage tank cap 16. Remove the storage tank cap 16 from the tank and pour out the fluid in the storage tank 13. Add the material to be injected, to the storage tank 13. Put the storage tank cap 16 on the tank and attach the inlet connection tube 2 and outlet connection tube 9 to the storage tank cap 16. Adjust the mixing valve 8a to the desired injection rate and turn on flow in fluid flow line 1.

Figure 4:
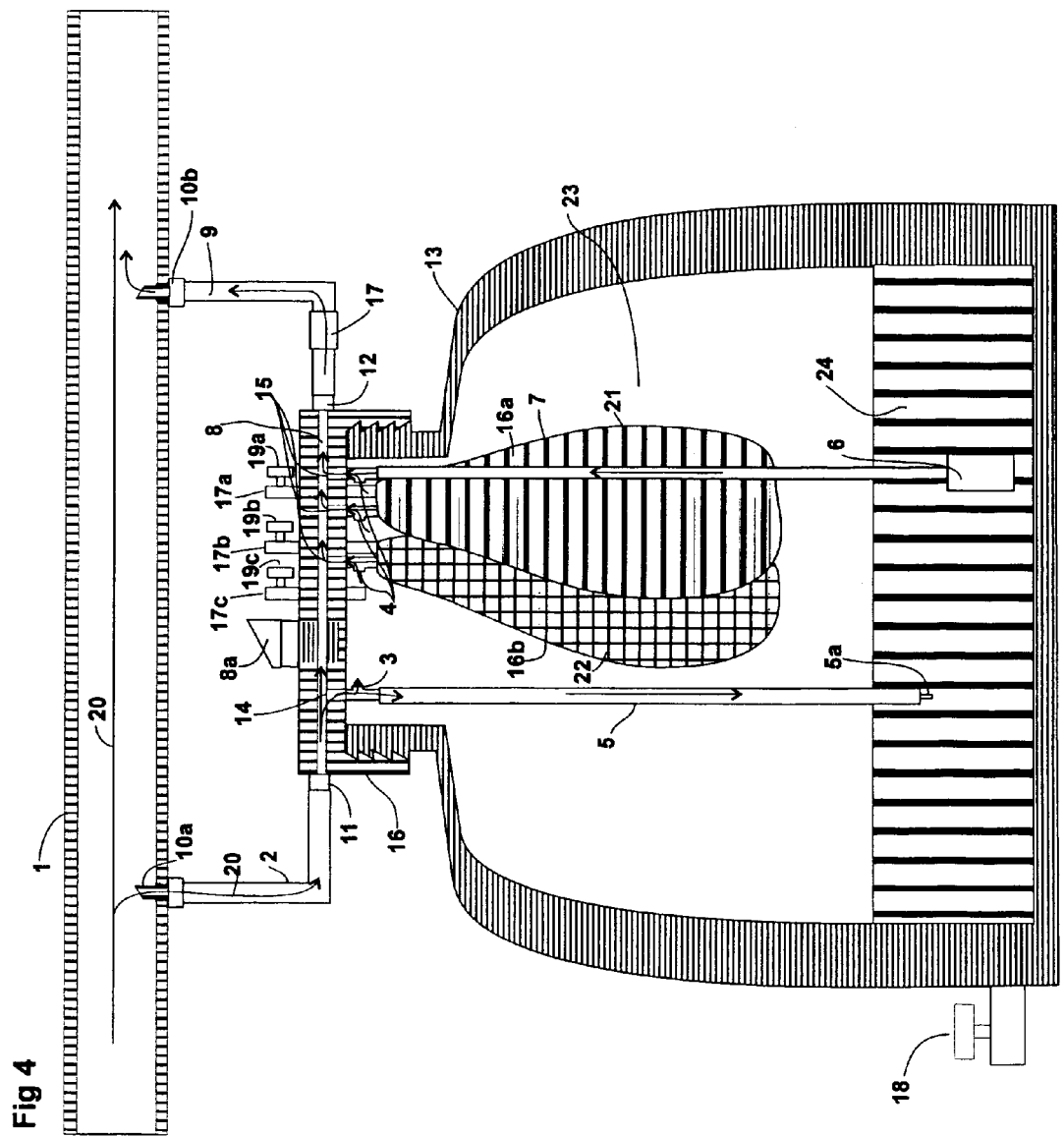
FIG. 4 shows an overview of the system with multiple bladders.

FIG. 4—Additional Embodiment

An additional embodiment is shown in FIG. 4. It shows the addition of bladder 16a and 16b. Bladder 16a is connected to vent/proportioner port 4a that is connected to tank outlet port 4. Bladder 16b is connected to vent/proportioner port 4b that is connected to tank outlet port 4. Fill port 17a is connected to bladder 16a. Fill port 17b is connected to bladder 16b. Fill port 17c is connected to storage tank 13. Drain valve 18 is connected to storage tank 13. Fill port valve 19a is connected to fill port 17a. Fill port valve 19b is connected to fill port 17b. Fill port valve 19c is connected to fill port 17c.

FIG. 4—Operations

The method of using the fluid injector with vent/proportioner ports as shown in FIG. 4 is to turn off all flow in fluid flow line 1. Relieve system pressure by opening a valve downstream in the fluid flow line 1. When the pressure is relieved, close the valve. Drain all fluid from storage tank 13 by opening drain valve 18 and fill port valve 19c. When all fluid has been drained from storage tank 13, close drain valve 18. Open fill port valve 19a and pour injection solution 21 into bladder 16a. When the desired quantity of injection solution 21 has been poured in, close fill port valve 19a. Open fill port valve 19b and pour the desired amount of injection solution 22 into bladder 16b. When the desired quantity of injection solution 22 has been poured in, close fill port valve 19b. Pour the desired amount of injection solution 20 in fill port 17c. When the desired amount of solution has been poured in, close fill port valve 19c. Open the valve to allow flow into fluid flow line 1.

When the system is operating, fluid from the fluid flow line 1 enters the storage tank 13 through the tank inlet port 14 and the crossover connection 8. The fluid entering the tank pressurizes the storage tank 13, bladder 16a and bladder 16b. The negative pressure created by tap fitting 10b along with the positive pressure created by tap fitting 10a create flow from bladder 16a, bladder 16b and storage tank 13. Bladder 16a and bladder 16b are made of flexible material that collapses as fluid is removed. They are used to contain injection solutions that need to be separated due to their reaction to other solutions in the storage tank 13 or if their specific gravity is the same or lighter than the fluid entering the storage tank 13 from the fluid flow line 1. As injection solution 21 leaves bladder 16a and flows through tank outlet port 15, it is premixed with fluid from storage tank 13 to a preset ratio determined by the orifice size of the outlet vent/proportioner port 4a. As injection solution 22 leaves bladder 16b and flows through tank outlet port 15, it is premixed with fluid from storage tank 13 to a preset ratio determined by the orifice size of the outlet vent/proportioner port 4b. All solutions leaving storage tank 13 are then mixed with the fluid in crossover connection 8. Mixing valve 8a sets the injection ratio for the combined solutions before they enter fluid flow line 1.

SUMMARY, RAMIFICATIONS, AND SCOPE

Accordingly, the reader will see that the fluid injector with vent/proportioner ports will provide many advantages to consumers, industry and the environment. It provides an economical means of accurately injecting solutions that are normally difficult to inject. It can inject multiple solutions simultaneously into a flow line, each with their own injection ratio. Incompatible products can be combined in one tank and one installation. It is very easy to use and has a long service life with very low maintenance requirements. It easily adapts from small to large applications. It can be manufactured easily and economically from products readily available in the marketplace. It can be fabricated from plastic or metal piping components or molded.

While the above description contains many specificities, these should not be construed as limitations on the scope of the invention, but rather as an exemplification of one preferred embodiment thereof. Many other variations are possible. For example additional crossover connections with control valves could be added to provide specific flow adjustment for all solutions in the storage tank. The crossover connection and control valve could be eliminated and the proportioning rates set only by the vent/proportioner ports. The agitation tube could be removed for products that are lighter and easier to inject. The system can accommodate filling and draining with ports sealed by valves, plugs or caps. The system can have the fluid flow line attach to it or have it attach remotely. It can be designed to attach to the end of a fluid flow line of any type.

Accordingly, the scope of the invention should be determined not by the embodiments illustrated, but by the appended claims and their legal equivalents.

I claim:

1. A solution dispenser for dispensing a solution. into a flow line at a metered rate, said dispenser consisting of:

(a) a storage tank containing the solution to be dispensed, the tank having means of filling and draining the tank;

(b) an inlet connection an the storage tank that communicates with the flow line to provide a conduit for flow from the flow line to the storage tank;

(c) an outlet connection on the storage tank that communicates with the flow fine to provide a conduit for flow from the storage tank to the flow line;

(d) a means of creating flow from the flow line to the storage tank, through the inlet connection and from the storage tank through the outlet connection to the flow line;

(e) a port in the inlet connection that communicates with fluids and air from the outlet connection and the storage tank, located in the upper portion of the storage tank to provide means of air evacuation from the storage tank and to prevent back flow from the storage tank;

(f) a port in the outlet connection that communicates with fluids and air from the inlet connection and the storage tank, located in the upper portion of the storage tank to provide means of air evacuation from the storage tank, to prevent back flow from the storage tank set metered injection rates and enable the outlet connection to extend to the lower portion of the storage tank;

(g) an extension of the outlet port connection that communicates with fluid in the lower portion of the storage tank, to provide consistently metered flow of an injection solution that is heavier than the fluid entering the storage tank from the flow line.

2. The invention as defined in claim 1 with one or more ports communicating between the inlet and outlet connections, with one or more valves to control the flow of fluid from the inlet connection to the outlet connection.

3. The invention as defined in claim 1 with one or more bladders in the storage tank to separate one or more solutions within the storage tank, each communicating with the outlet connection, each with one or more ports communicating with the inlet and outlet connections to the storage tank and to fluids and air in the storage tank.

4. The invention as defined in claim 1 with the inlet connection port extending to the lower portion of the storage tank to provide agitation to solutions heavier than the fluid entering the storage tank.

5. The invention as defined in claim 4 with one or more valves to control the flow from the inlet connection to the outlet connection.

* * * * *